United States Patent
Williams

(10) Patent No.: US 6,262,768 B1
(45) Date of Patent: Jul. 17, 2001

(54) DUAL CAMERA DAY/NIGHT MONITORING APPARATUS

(75) Inventor: Jarvis L. Williams, Bloomfield Hills, MI (US)

(73) Assignee: Detection Systems & Engineering Company, Troy, MI (US)

(*) Notice: Subject to any disclaimer, the term of this patent is extended or adjusted under 35 U.S.C. 154(b) by 0 days.

(21) Appl. No.: 09/292,175

(22) Filed: Apr. 15, 1999

(51) Int. Cl.[7] .............................. H04N 5/225; H04N 7/18
(52) U.S. Cl. ........................... 348/217; 348/151; 348/159; 348/169; 348/211; 348/366; 348/373; 396/427
(58) Field of Search ...................... 250/214 VT; 348/143, 348/151–155, 169, 207, 211–214, 216–218, 239, 373–375, 159, 362–366; 396/419, 427, 428; H04N 5/225, 7/18

(56) References Cited

U.S. PATENT DOCUMENTS

| H1599 | * 10/1996 | Task | 348/33 |
|---|---|---|---|
| 2,481,082 | 9/1949 | Chew . | |
| 2,914,746 | 11/1959 | James et al. . | |
| 3,217,098 | 11/1965 | Oswald . | |
| 3,482,037 | 12/1969 | Brown et al. . | |
| 3,564,132 | 2/1971 | Baker . | |
| 3,612,764 | 10/1971 | Gilkeson . | |
| 3,701,100 | 10/1972 | Yarbrough . | |
| 3,814,841 | 6/1974 | Ulicki . | |
| 4,054,910 | 10/1977 | Chou et al. . | |
| 4,067,045 | 1/1978 | Provost et al. . | |
| 4,293,876 | 10/1981 | Williams . | |
| 4,310,855 | 1/1982 | Holzgrafe . | |
| 4,626,905 | * 12/1986 | Johnson | 348/217 |
| 4,935,817 | 6/1990 | Gilligan . | |
| 4,974,088 | 11/1990 | Sasaki . | |
| 5,051,821 | 9/1991 | Vittot et al. . | |
| 5,107,333 | * 4/1992 | Poque | 348/217 |
| 5,181,120 | * 1/1993 | Hickey | 348/143 |
| 5,214,503 | 5/1993 | Chiu et al. . | |
| 5,373,320 | * 12/1994 | Johnson | 348/217 |
| 5,428,421 | * 6/1995 | Kawahara | 348/363 |
| 5,453,782 | 9/1995 | Hertel . | |
| 5,459,512 | * 10/1995 | Kawahara | 348/363 |
| 5,481,401 | * 1/1996 | Kita | 359/353 |
| 5,745,170 | 4/1998 | Palmer . | |
| 5,898,459 | 4/1999 | Smith et al. . | |
| 5,923,364 | * 7/1999 | Rhodes | 348/159 |
| 6,047,880 | * 5/2000 | Schnee | 348/113 |

* cited by examiner

Primary Examiner—Wendy R. Garber
Assistant Examiner—Ngoc-Yen Vu
(74) Attorney, Agent, or Firm—Young & Basile, PC

(57) ABSTRACT

A remote controlled television monitoring system for day and night monitoring includes a camera unit in the form of a housing having first and second cameras. The first camera principally monitors during daylight conditions; while the second camera monitors during low light or night conditions. The second camera preferably has a high low light sensitivity. Both of the cameras have automatic iris over ride for manual control of the camera iris. Each of the cameras optionally has an azimuth generator to indicate angular position of the camera. An adjustable zoom lens is coupled to each of the cameras. In one aspect, a light intensifier is coupled between the lens and the second camera for intensifying light received by the second camera. The light intensifier preferably has internal automatic brightness control.

8 Claims, 4 Drawing Sheets

DUAL CAMERA DAY/NIGHT MONITORING APPARATUS

BACKGROUND OF THE INVENTION

1. Field Of The Invention

The present invention relates, in general, to remote controlled, closed circuit television monitoring systems and, in particular, to television monitoring systems which are capable of both day and night operation.

2. Description of the Art

In closed circuit monitoring systems, one or more cameras are contained within a housing which is either stationarily mounted on a fixed bracket or attached to a pan/tilt apparatus for panning and elevational movements to cover a wide field of vision. A typical television monitoring system is shown by the Applicant's U.S. Pat. No. 4,293,876 and includes a dual channel camera unit, a transmitter or controller and a receiver. The camera unit includes a color daylight camera, a low light camera, a light intensifier coupled to the low light camera and a channel control circuit. The channel control circuit provides automatic switching between the daylight and the low light cameras in response to variations in the ambient light intensity.

While this monitoring system has proven to be an effective surveillance device, it would be desirable to provide an enhanced monitoring system which takes advantage of recent camera developments so as to improve visual resolution under low light conditions.

SUMMARY OF THE INVENTION

The present invention is a television monitoring system operative during both daylight and low light or night conditions.

The television monitoring system includes a camera apparatus formed of a first camera for monitoring principally during daylight conditions and a second high sensitivity low light camera for monitoring principally during low light or night conditions. At least one and preferably both of the first and second cameras have automatic iris override for selective control of the camera iris. A control circuit is provided for selectively energizing, utilizing and de-energizing the first and second cameras in response to a predetermined variation in ambient light intensity so that only one of the first and second cameras is energized in daylight or night at one time.

Optionally, at least one and, preferably, both of the first and second cameras have an azimuth generator which provides an output indicative of the position of the camera.

In one embodiment, the second camera is a CCD camera with a high low light sensitivity of substantially 0.08 lux.

Further, each of the first and second cameras is provided with an adjustable zoom lens. In one embodiment, a light intensifier is coupled between the zoom lens and the second camera for intensifying the light received by the second camera. The light intensifier has automatic brightness control for improved contrast.

The camera unit of the present television monitor apparatus provides enhancements over previously devised television monitoring systems. The camera unit takes advantage of improvements in camera design which enable automatic override of the camera iris for better brightness control or contrast as well as to change the focal length of the camera for specific viewing of a predetermined object or portion of a surveillance area.

Small sized cameras may be employed to reduce the overall size of the camera apparatus enclosure. An optional azimuth generator can be utilized on either or both of the cameras to provide an indication of the position of the cameras. This can be compared with the selected azimuth of the pan/tilt unit to determine the position of the camera apparatus.

While the camera apparatus of the present invention provides the aforementioned advantages, the camera apparatus still retains the standardized single video output and single control cable input to the camera apparatus as required in the monitoring industry. This enables the camera apparatus to be employed with any industry standard remote camera controller, control signal transmitter and receivers, and pan/tilt units.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 1:
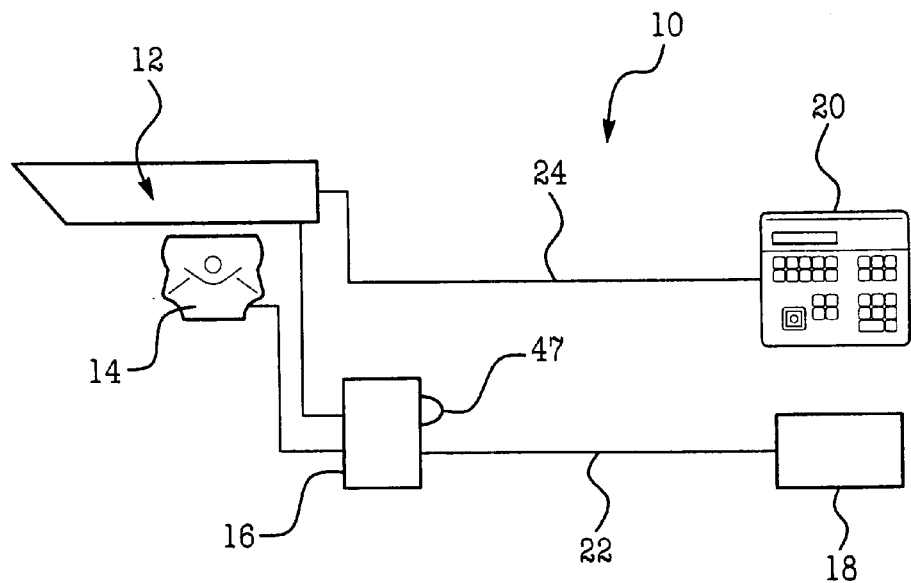
FIG. 1 is a pictorial representation of a television monitoring apparatus according to the present invention.

As shown in FIG. 1, the present invention is a television monitoring apparatus 10 which includes a dual channel camera unit 12, a pan/tilt unit 14, a receiver 16, a transmitter or controller unit 18 and a television monitor 20.

The operation of the camera unit 12 and the pan/tilt unit 14 is controlled by the transmitter/controller 18. Control signals are sent from the transmitter 18 through a cable 22 to the receiver. The signals are then processed and sent to the various video control circuits in the pan/tilt unit 14 and the camera unit 12. Although a cable is preferable for connecting the transmitter 18 to the receiver 20, other communication techniques, such as radio frequency signals, etc., may also be employed.

The video output signal from the camera unit 12 is transmitted by a cable 24 to the remotely located television monitor 20. Any suitable television monitor 20 may be employed. Preferably, the TV monitor 20 is a video monitor which provides 300 lines of color and 450 lines black and white video.

The receiver 16 and the transmitter/controller 18 are conventionally available receiver and controller units, such as a receiver, model number KTD-125 and a transmitter/controller, model number KTD-304, both manufactured by Kalatel, Inc.

As is conventional, the controller 18 contains a number of push buttons which control the application of electrical power to the camera unit 12 as well as an auto/manual joystick which can be operated in conjunction with one of the push buttons to control the speed and direction of pan movement of the pan/tilt unit 14, and the speed and direction of movement of the tilt mechanism pan/tilt unit 14 during manual operation.

In automatic mode, the pan/tilt unit 14 sweeps or pans the camera unit 12 right and left within the boundaries determined by adjustable limit switches or other limit stops contained in the pan/tilt unit 14. During such pan movements, the tilt or elevation of the camera unit 12 remains constant after having been set by the user for a particular application. As is conventional, the pan/tilt unit 14 is capable of panning from 0° to 340° horizontally and tilting from 45° above and 45° below horizontal.

Other push buttons on the controller 18 provide zoom, focus and iris opening controls for both cameras in the camera unit 12.

Figure 2:
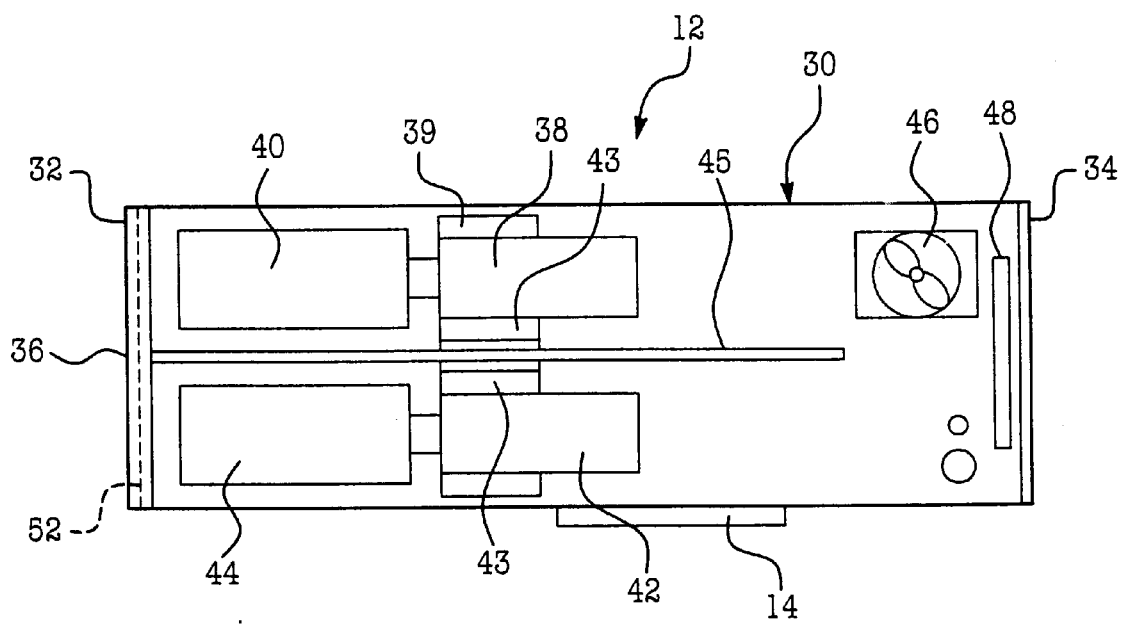
FIG. 2 is a plan elevational view of one embodiment of the dual channel camera unit shown in FIG. 1.
Figure 3:
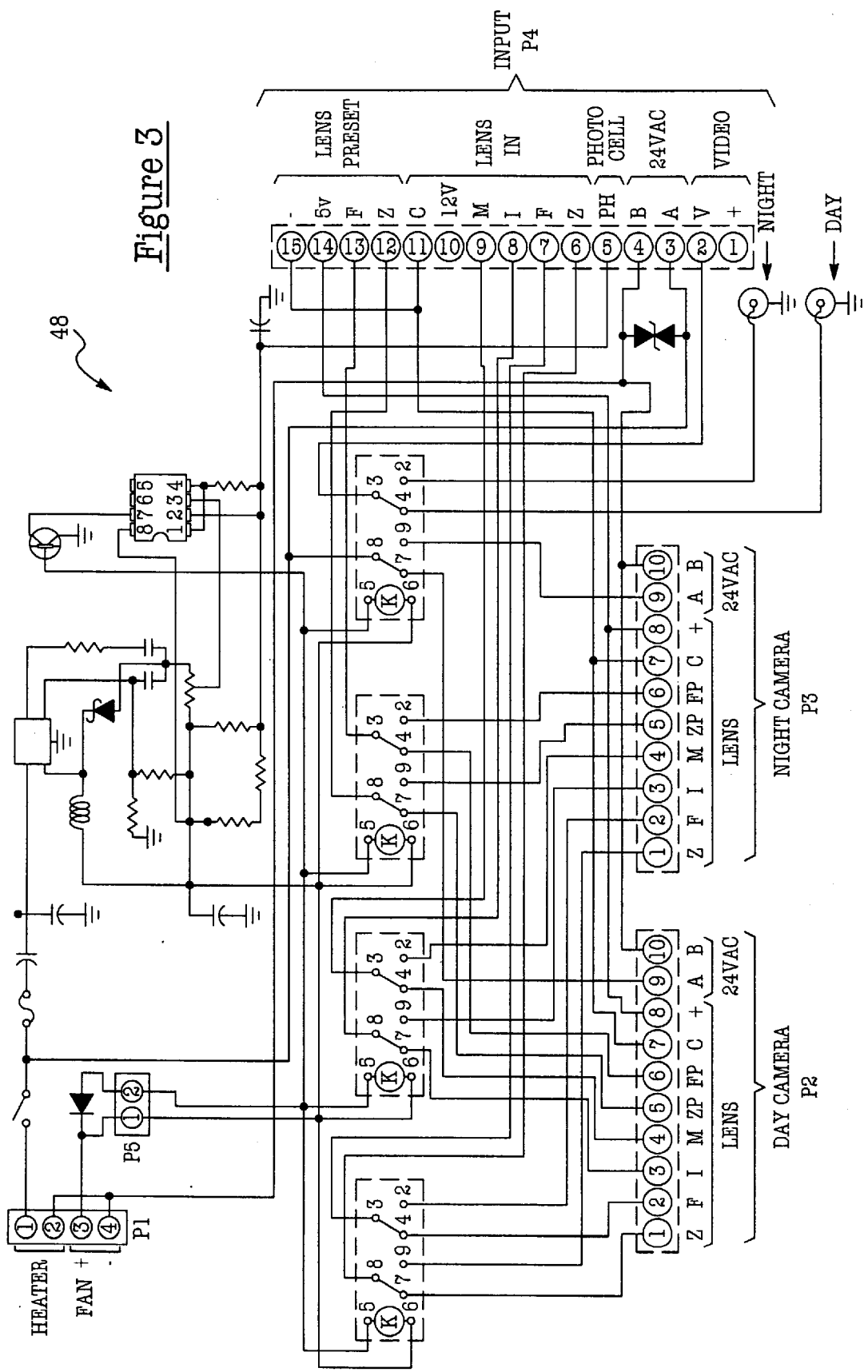
FIG. 3 is a schematic diagram of the logic circuit employed in the camera unit shown in FIG. 2.

Referring now to FIG. 2, there is depicted one embodiment of the dual channel camera unit 12 which in the form of a closed housing 30. The housing 30 has a generally rectangle configuration, by example only, which is formed of four sidewalls and opposed first and second ends 32, 34, respectively. A face plate 36 is mounted in the first ends 32 of the housing 30 to provide a viewing port for the cameras mounted within the housing 30 as well to protect the cameras from moisture, dirt, wind, etc. Inside the face plate is a mask 52 which outline the lenses and reduces spurious light.

The dual camera unit 12 according to one aspect of the present invention is a dual channel design which includes one color camera 38 with digital signal processing. Preferably, the color camera 38 is a CCD camera. The color camera 38 is provided with an auto iris motorized zoom lens 40 with presets. By example only, the zoom lens 40 may have an apparent focal length of 30–180 mm. Further, the color camera 38 has a light sensitivity of approximately 2 lux with digital processing and backlight compensation.

Figure 4:
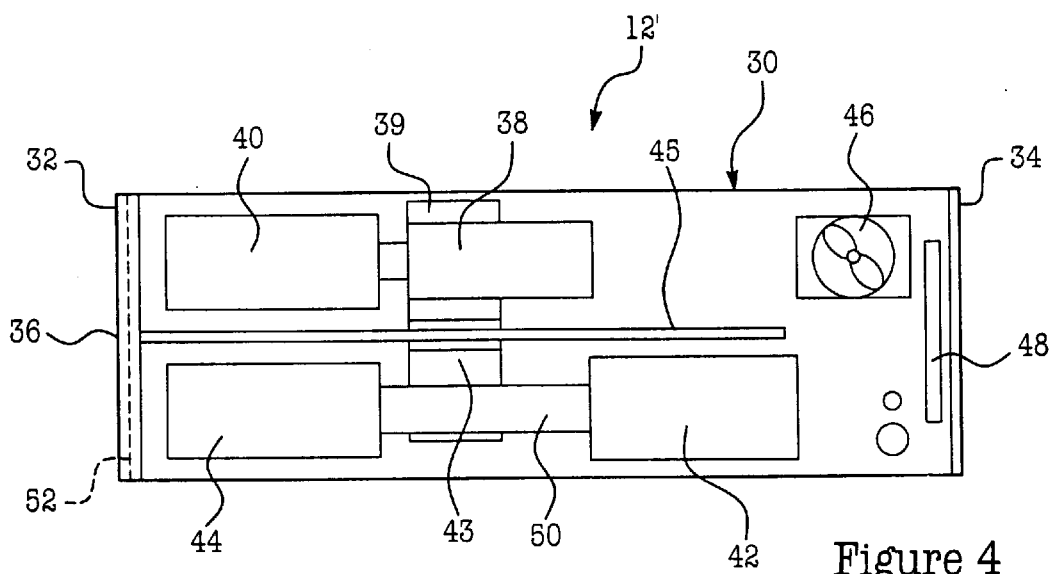
FIG. 4 is a plan elevational view of another embodiment of the camera unit of the present invention.

The camera unit 12 also includes a black/white, high sensitivity camera 42 which is mounted in the housing 30 by a mounting bracket 43. The black/white camera 42 is also provided with a motorized zoom lens 44 which has digital presets for night or low light operation. The zoom lens 44 may be any suitable zoom lens, such as a zoom lens having an apparent focal length of 30–180 mm. The camera 38 and 42 are mounted via brackets 39 and 43 to an elongated mounting bracket 45 which extends longitudinally along the length of the housing 30. A small fan 46 is also mounted within the housing adjacent the second end 34. A logic or control circuit 48 on a printed circuit board is also mounted adjacent the second end wall 34 of the housing 30. The logic circuit 48, as shown in FIG. 4, provides connection between the pair of control cables from the receiver 16 and the coax video output cable 24. In accordance with industry standards, only one coax cable and one control cable is connected to the camera unit 12. The logic board 48 functions to sense change in voltage from a photo cell to accomplish video output from either day or night camera and controls for the operation of the motorized zoom lenses via relays, and supply power for the intensifier 50.

Individual conductors, not shown, extend from the logic circuit 48 to each of the cameras 38 and 40 as well as to the motorized zoom lenses 40 and 44, the fan 46 and to an optional heater, not shown. The logic circuit 48 accepts inputs from the receiver 16 as well as provides outputs to the receiver 16 to enable control of each camera 38 and 42, the automatic switching between the two cameras 38 and 42 in response to ambient light conditions as detected by a photocell 47 mounted on the receiver 16. The logic circuit 48 also combines the individual video output of the day color camera 38 and the night black/white camera 42 into a single video output to the monitor 20.

FIG. 4 depicts an alternate embodiment of the dual camera unit 12' in which the same color camera 38 with digital signal processing as in the first embodiment described above is mounted. The auto iris motorized zoom lens 40 is also employed with the color camera 38.

This embodiment also includes one black/white high sensitivity camera 42 and the auto iris motorized zoom lens 44. However, in this embodiment of camera unit 12', a third generation light intensifier with auto bright control 50 is coupled between the black/white camera 42 and the output end of the zoom lens 44 for intensifying light received by the camera 42.

Otherwise, the camera unit 12' shown in FIG. 4 is identical to the camera unit 12 shown in FIG. 2 in that a logic or control circuit 48 is mounted within the housing 30 to control the operation of the cameras 38 and 42, the zoom lenses 40 and 44, the fan 46 and the heater, not shown.

In this embodiment, the light intensifier 50 increases the light sensitivity of the black light, night camera 42 under night or low light conditions to 0.00001 lux.

Both of the cameras 38 and 42 in either embodiment may be any suitable CCD cameras, such as color and black/white cameras sold by Panasonic.

Either or both cameras, including the color 38 camera and the black/white camera 42 in either embodiment are also provided with certain features, such as an azimuth generator and an auto iris override.

The auto iris override feature of the cameras 38 and 42 provides automatic iris control via through the lens metering. Control signals from the controller 18 are provided to each camera 38 or 42 to control the iris diameter and thereby the field of view of the camera 38 or 42. This enables a user to adjust the iris diameter for proper lighting and contrast as well as to enable the camera 38 and 42 to clearly focus up close on an object within the field of view of the camera 38 or 42.

Manual control of auto iris is accomplished by adding a relay into the lens. The remote function requires three positions: 1) auto, 2) manual, and 3) normal.

Both cameras 38 and 42 and the logic circuit 48 are capable of receiving signals from the controller 18 to manually select either day or night cameras 38 or 42 for operation at any time. Although high intensity lighting must be avoided when using the black/white, intensified night camera 42, the ability to manually select day or night camera operations could be useful at dusk, dawn or in other low light conditions, such as during a storm, or where the camera unit 12 is used inside a building and the user decides to improve monitoring capabilities by selecting either of the color camera 38 or the black and white camera 42 for immediate operation.

Finally, each camera 38 and 42 is provided with a video azimuth generator which provides a video character as a separate output signal from the receiver 16 to a display on the controller 18. This enables a user to determine the exact position of the camera 38 or 42. This position display can be compared with a display on the controller 18 set by the individual switches or push buttons on the controller 18 which establishes the tilt or angle of elevation of the camera unit 12.

Figure 5:
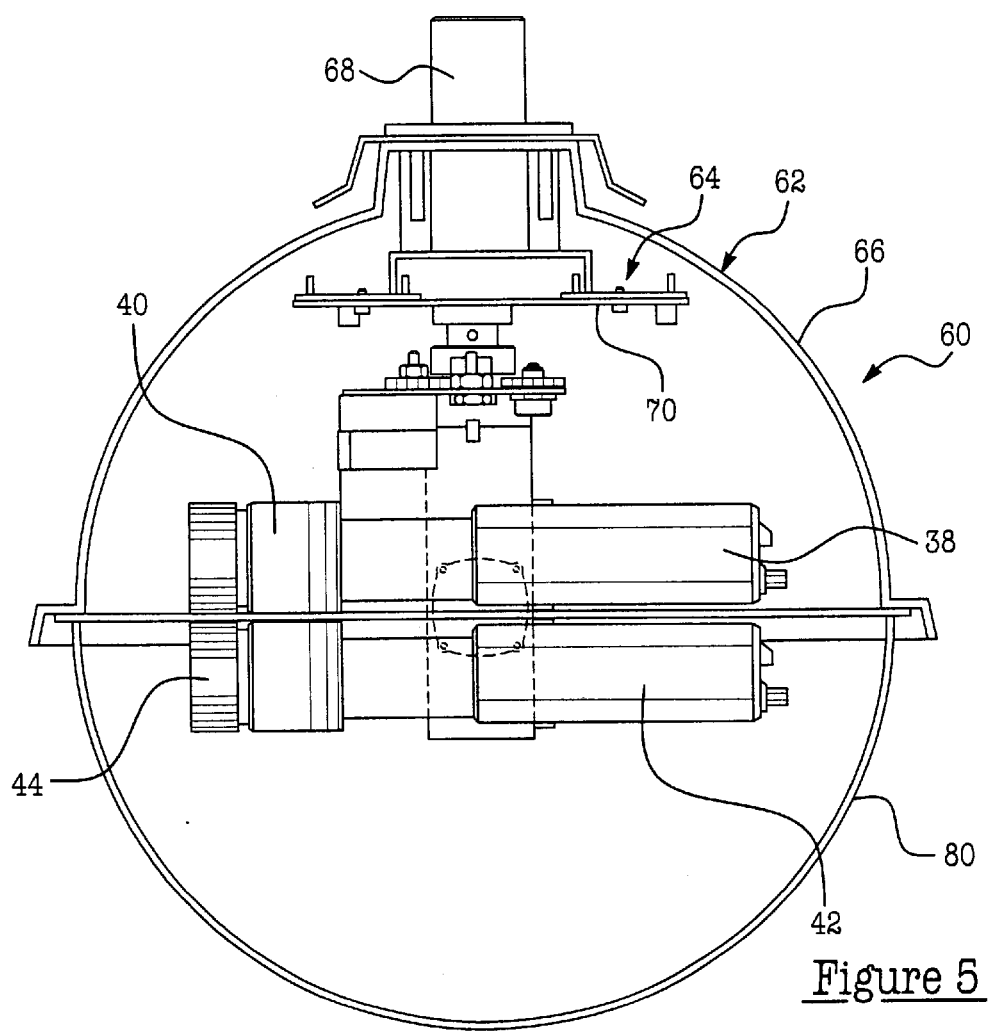
FIG. 5 is a side elevational view of another embodiment of the television monitoring apparatus of the present invention.
Figure 6:
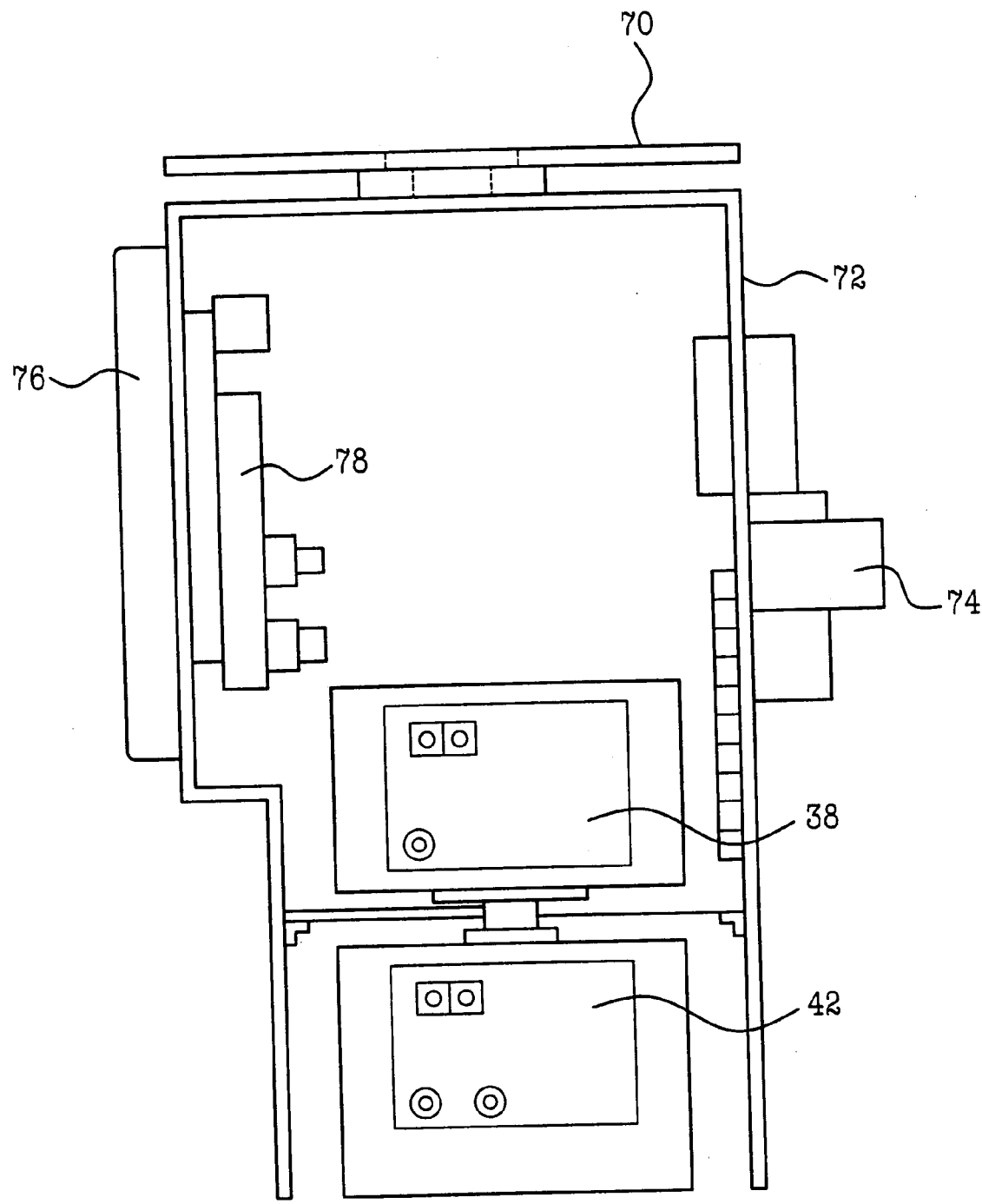
FIG. 6 is a pictorial representation of the components of the television monitoring apparatus shown in FIG. 5.

Referring now to FIGS. 5 and 6, there is depicted another camera apparatus 60 in which the color day camera 38 and the high sensitivity black/white, night camera 42 are mounted within a spherical dome enclosure 62.

The dome 62 may be any suitable enclosure, such as a Superdome housing, model numbers SDP16 or SDW16, Detection Systems & Engineering Company, Troy, Mich. The dome 62 includes an integral pan/tilt assembly 64 which is mounted within an opaque, upper hemispherical portion or housing 66. A tubular sleeve 68 extends through the upper portion 66 and carries the cables to the camera unit mounted within the dome 62. The sleeve 68 may also be formed part of or be attached to a separate mounting bracket on a stationary fixture, pole, etc.

A turntable 70 is rotatably mounted on the sleeve 68 and driven by the pan drive motor and a bracket 72 coupled to the turntable 70 and having a yoke extending downward therefrom. A pivot axis is formed on the yoke 72 on which a tilt drive motor 74 is mounted along with mounting brackets carrying the cameras 38 and 42.

As shown in FIG. 6, a receiver circuit 76 is mounted to one side of the yoke or bracket 72. The receiver circuit 76 may be a Kalatel receiver model number KTD128 for receiving signals from the transmitter/controller 18.

The dome receiver 76 is inboard of the housing and provides the same control function for pan, tilt, and zoom as the outboard controller. For service simplicity, these are kept separate in the dome.

The logic circuit 78, shown generally in FIG. 6 is mounted to one leg of the bracket 72.

The receiver circuit 76 controls power to the pan and tilt drive motor of the pan/tilt as well as the zoom and auto focus signals to the cameras 38 and 42. The logic circuit 78 also provides RS422 communication to the controller 18.

A lower hemispherical portion 80 is also provided as part of the dome 62. The lower hemispherical portion 80 is rotatable with respect to the upper hemispherical portion 66. A bracket is connected between the turntable 70 and the lower hemispherical portion 80 to simultaneously rotate the lower hemispherical portion 80 with scanning movements of the cameras 383 and 42.

The lower hemispherical portion 80 may be formed of a dark opaque plastic which prevents an observer from easily detecting the direction of focus of the cameras 38 and 42. The lower hemispherical portion 80 is provided with an elongated slot, not shown, extending from the lowermost pole toward the upper edge of the lower hemispherical portion 80. This slot, not shown, is aligned with the lenses 40 and 44 attached to the cameras 38 and 42 and provides a covered opening defining the field of view of the cameras 38 and 42.

An azimuth circuit, not shown, resides in the receiver for both dome and conventional modules.

What is claimed is:

1. A camera apparatus for a visual monitoring apparatus, the camera apparatus comprises:

a first camera for monitoring principally during low light conditions;

a second camera for monitoring principally during loe light conditions; the second camera being a CCD camera with a high low light sensitivity of substantially 0.08 lux;

the first camera having automatic iris override for selective adjustment of the camera iris; and a control circuit for selectively energizing, utilizing and de-energizing the first and second cameras in response to a predetermined variation in ambient light intensity so that only one of the first and second cameras is energized at one time.

2. The camera apparatus of claim 1 wherein an azimuth generator is associated with at least one of the first and second cameras, the azimuth generator providing a signal indicative of the direction of the at least one of the first and second cameras, the signal generating a visual character display of the at least one of the first and second cameras direction.

3. The camera apparatus of claim 1 further consisting of:

an adjustable zoom lens coupled to the second camera.

4. The camera apparatus of claim 1 further comprising:

a housing;

the first camera mounted in the housing; and the second camera mounted in the housing.

5. The camera apparatus of claim 1 wherein the housing is a spherical dome-shaped enclosure, the first and second cameras and the control circuit mounted in the spherical dome-shaped enclosure.

6. The camera apparatus of claim 5 further comprising:

a base movably mounted in the dome-shaped enclosure, the first and second cameras and the control circuit mounted on the base.

7. The camera apparatus of claim 5 wherein at least a portion of the dome-shaped enclosure is transparent.

8. The camera apparatus of claim 7, wherein:

a lower portion of the dome-shaped enclosure is formed of an opaque material; and a transparent portion is formed in the lower portion aligned with the first and second cameras; and the lower portion coupled to the first and second cameras for movement with the first and second cameras.

* * * * *